(12) United States Patent
Huang et al.

(10) Patent No.: US 9,870,739 B2
(45) Date of Patent: Jan. 16, 2018

(54) DISPLAY WITH BACKLIGHT AND TEMPERATURE COLOR COMPENSATION

(71) Applicant: Apple Inc., Cupertino, CA (US)

(72) Inventors: Yi Huang, Santa Clara, CA (US); Chenhua You, San Jose, CA (US); Gabriel Marcu, San Jose, CA (US); Jun Qi, Cupertino, CA (US); Marc Albrecht, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/918,402

(22) Filed: Oct. 20, 2015

(65) Prior Publication Data

US 2016/0335958 A1    Nov. 17, 2016

Related U.S. Application Data

(60) Provisional application No. 62/160,763, filed on May 13, 2015.

(51) Int. Cl.
*G09G 3/34* (2006.01)
*G09G 3/36* (2006.01)
(Continued)

(52) U.S. Cl.
CPC ......... *G09G 3/3413* (2013.01); *G02B 6/0073* (2013.01); *G02F 1/133603* (2013.01);
(Continued)

(58) Field of Classification Search
CPC ......... G09G 3/3406; G09G 2320/0646; G09G 2360/16; G09G 2330/021; G09G 2320/064; G09G 3/3413; G09G 3/36; G09G 2320/0242; G09G 2320/041; G09G 2320/0233; G09G 3/3611; G09G 2320/0285
See application file for complete search history.

(56) References Cited

U.S. PATENT DOCUMENTS 7,638,744 B2    12/2009 Huang et al.
7,671,832 B2    3/2010 Lankhorst et al.
(Continued)

FOREIGN PATENT DOCUMENTS

EP    2023328    2/2009

*Primary Examiner* — Md Saiful A Siddiqui
(74) *Attorney, Agent, or Firm* — Treyz Law Group, P.C.; G. Victor Treyz; Vineet Dixit (57) ABSTRACT

An electronic device may have a display such as a liquid crystal display. The display may have an array of pixels that display images to a user. Backlight structures may provide the array of pixels with backlight illumination at a backlight illumination level. The backlight structures may have a light source with an array of light-emitting diodes and photoluminescent material that is pumped by pump light from the light-emitting diodes. The backlight illumination may experience color variations as a function of the backlight illumination level. Circuitry in the electronic device may be used to implement a backlight level color compensator. The backlight level color compensator may apply color correction factors to the image data of the displayed images to compensate for variations in color of the image data due to variations in backlight illumination level and operating temperature.

19 Claims, 9 Drawing Sheets

| BACKLIGHT BRIGHTNESS | RED CORRECTION FACTOR | GREEN CORRECTION FACTOR | BLUE CORRECTION FACTOR |
|---|---|---|---|
| I1 | RCF1 | GCF1 | BCF1 |
| I2 | RCF2 | GCF2 | BCF2 |
| I3 | RCF3 | GCF3 | BCF3 |
| ⋮ | | | |
| I100 | RCF100 | GCF100 | BCF100 |

T=T1, T=T2, ... T=TN (51) Int. Cl.
*G02F 1/1335* (2006.01)
*F21V 8/00* (2006.01)

(52) U.S. Cl.
CPC ..... *G02F 1/133621* (2013.01); *G09G 3/3607* (2013.01); *G09G 3/3611* (2013.01); *G02F 2001/133601* (2013.01); *G02F 2001/133614* (2013.01); *G02F 2202/36* (2013.01); *G02F 2203/21* (2013.01); *G02F 2203/60* (2013.01); *G09G 2320/0233* (2013.01); *G09G 2320/0242* (2013.01); *G09G 2320/0285* (2013.01); *G09G 2320/041* (2013.01); *G09G 2320/0646* (2013.01); *G09G 2360/16* (2013.01)

(56) References Cited

U.S. PATENT DOCUMENTS

| | | | |
|---|---|---|---|
| 8,400,391 B2 | 3/2013 | Schmidt et al. | |
| 8,884,992 B2 | 11/2014 | Lee et al. | |
| 2008/0252582 A1* | 10/2008 | Wei | G09G 3/3406 345/89 |
| 2009/0033646 A1* | 2/2009 | Liu | G09G 3/3406 345/207 |
| 2011/0037926 A1* | 2/2011 | Tsukahara | G02B 6/0023 349/64 |
| 2012/0274544 A1* | 11/2012 | Nakajima | G01K 7/42 345/101 |
| 2014/0153282 A1* | 6/2014 | Ezell | G02B 6/0016 362/608 |
| 2014/0218539 A1* | 8/2014 | Matsui | G09G 3/3607 348/179 |

\* cited by examiner

| BACKLIGHT BRIGHTNESS | RED CORRECTION FACTOR | GREEN CORRECTION FACTOR | BLUE CORRECTION FACTOR |
|---|---|---|---|
| I1 | RCF1 | GCF1 | BCF1 |
| I2 | RCF2 | GCF2 | BCF2 |
| I3 | RCF3 | GCF3 | BCF3 |
| ⋮ | | | |
| I100 | RCF100 | GCF100 | BCF100 |

DISPLAY WITH BACKLIGHT AND TEMPERATURE COLOR COMPENSATION

This application claims the benefit of provisional patent application No. 62/160,763 filed on May 13, 2015, which is hereby incorporated by reference herein in its entirety.

BACKGROUND

This relates generally to electronic devices, and more particularly, to electronic devices with displays.

Electronic devices often include displays. For example, cellular telephones, tablet computers, and laptop computers often include displays for presenting information to a user.

Liquid crystal displays contain a layer of liquid crystal material sandwiched between upper and lower polarizers. Pixels in a liquid crystal display contain thin-film transistors and electrodes for applying electric fields to the liquid crystal material. The strength of the electric field in a pixel controls the polarization state of the liquid crystal material and thereby adjusts the brightness of the pixel. A liquid crystal display may have an array of color filter elements to provide the display with the ability to display color images.

The pixels in the liquid crystal display can be illuminated using a backlight unit. The backlight unit may include a light guide layer. The light guide layer may be formed from a transparent material such as a transparent polymer. An array of light-emitting diodes may emit light into the edge of the light guide layer. The light that is emitted into the edge of the light guide layer may be distributed throughout the light guide layer in accordance with the principle of total internal reflection.

It may be desirable to use light-emitting diode light sources with spectrally narrow bandwidths to enhance the color gamut of a display. One way in which to produce spectrally narrow backlight is to use backlight light sources that are based on blue light-emitting diodes pumping red and green phosphors. This type of approach produces narrow-bandwidth blue, green, and red light, but may introduce undesired color shifts as the level of the backlight is adjusted. Temperature variations may also affect display color accuracy.

It would therefore be desirable to be able to provide improved ways for ensuring that color images are accurately presented on a display in an electronic device.

SUMMARY

An electronic device may have a display such as a liquid crystal display. The display may have an array of pixels that display images to a user. Backlight structures may provide the array of pixels with backlight illumination at a backlight illumination level.

The backlight structures may have a light source with an array of light-emitting diodes and photoluminescent material that is pumped by pump light from the light-emitting diodes. The backlight illumination and therefore the display may experience color variations due to changes in the backlight illumination level. The display may also exhibit color variations due to changes in operating temperature.

Circuitry in the electronic device may be used to implement a backlight level color compensator. The backlight level color compensator may apply color correction factors to the image data of the displayed images to compensate for variations in color of the image data due to variations in backlight illumination level. The color compensator may also compensate for display color variations due to changes in operating temperature.

DETAILED DESCRIPTION

Electronic devices may include displays. The displays may be used to display images for a user. Illustrative electronic devices that may be provided with displays are shown in FIGS. 1, 2, 3, and 4.

Figure 1:
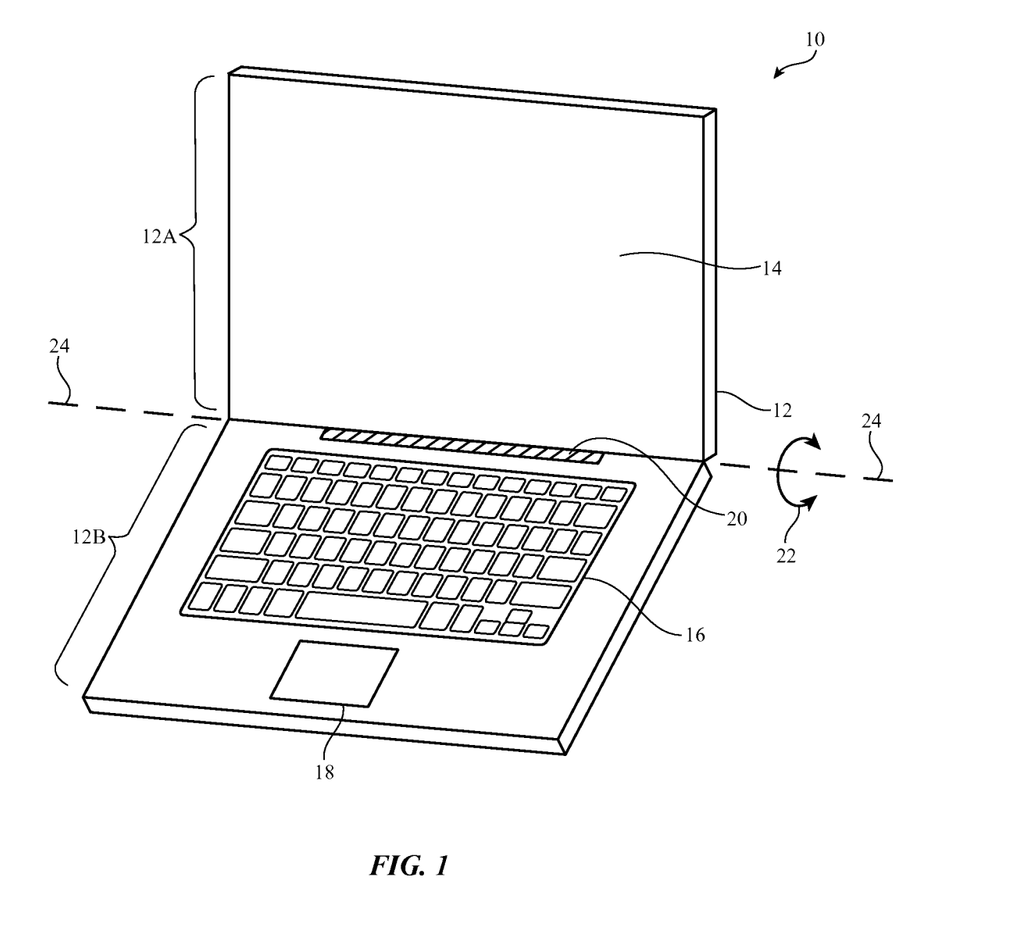
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
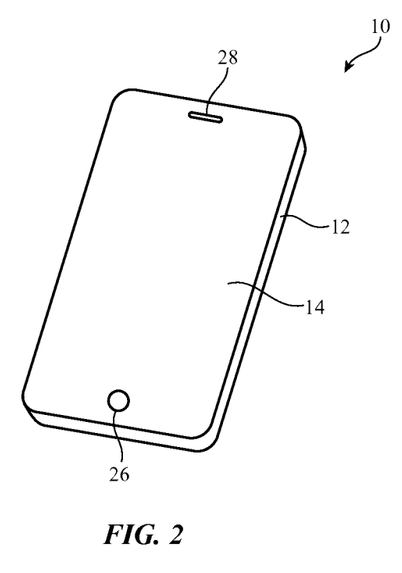
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
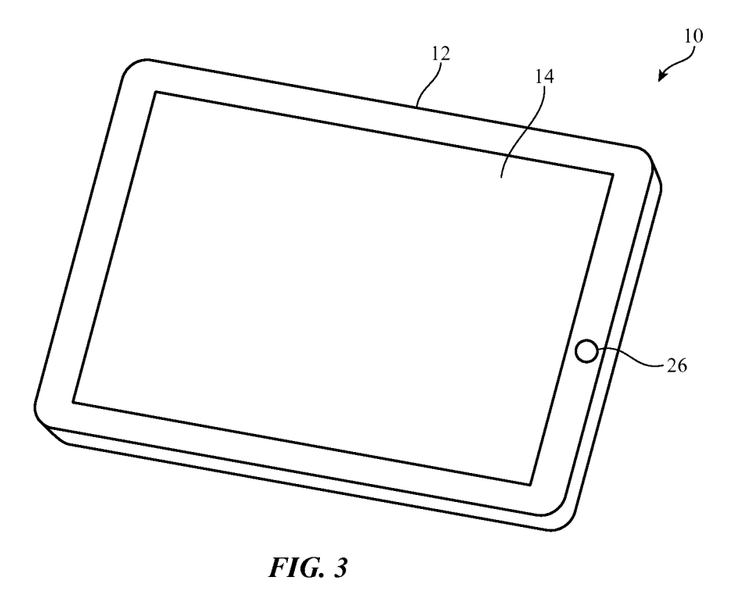
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
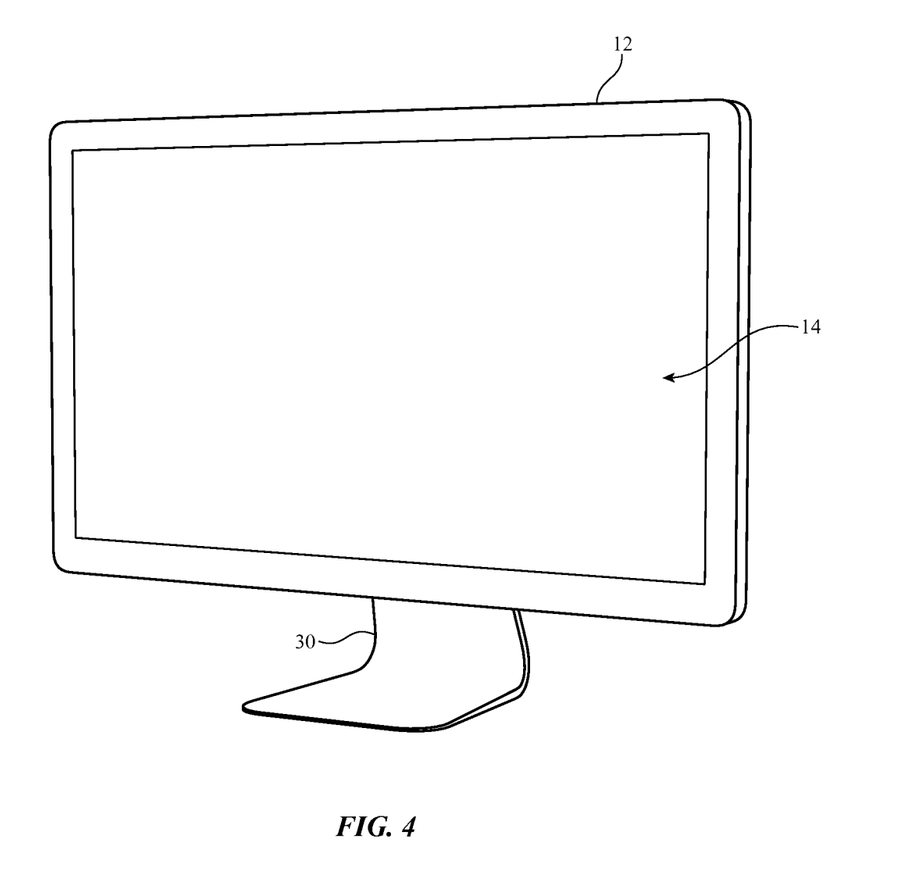
FIG. 4 is a perspective view of an illustrative electronic device such as a computer display with display structures in accordance with an embodiment.

FIG. 4 shows how electronic device 10 may be a display such as a display with an embedded computer, a display without an embedded computer, or other suitable equipment for displaying images. With this type of arrangement, housing 12 for device 10 may be mounted on a support structure such as stand 30 or stand 30 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a tablet computer, a cellular telephone, a media player, or other handheld or portable electronic device, a smaller device such as a wrist-watch device, a pendant device, a headphone or earpiece device, or other wearable or miniature device, a computer monitor or other display containing an embedded computer or other processor, a computer monitor or other display that does not contain an embedded computer or other processor, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components or other suitable components (e.g., electrophoretic display pixels, electrowetting display pixels, etc.). A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
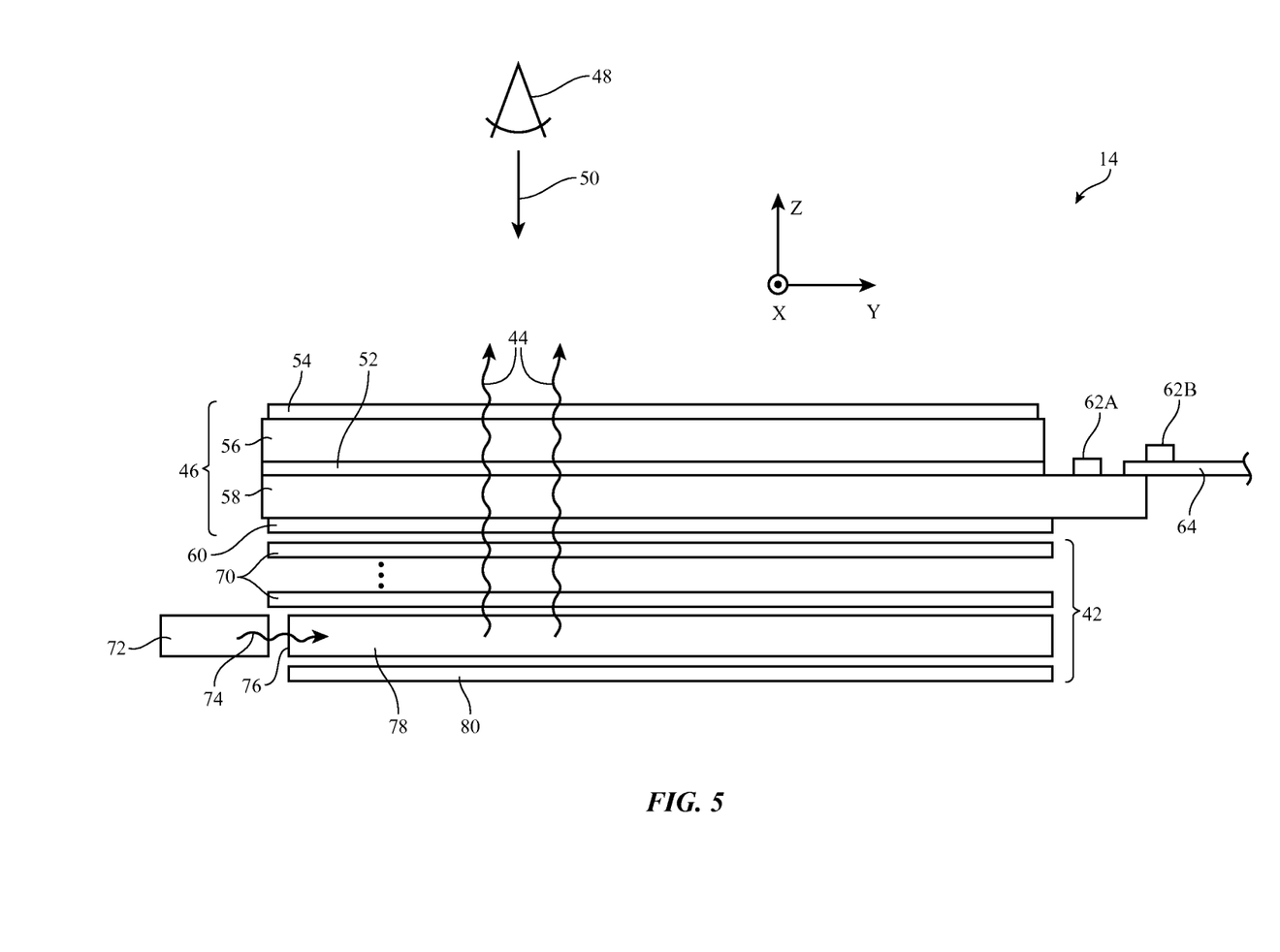
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight illumination 44 travels outwards (vertically upwards in dimension Z in the orientation of FIG. 5) and passes through display pixel structures in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide layer such as light guide layer 78 (sometimes referred to as a light guide). Light guide layer 78 may be formed from a transparent material such as clear glass or plastic (e.g., molded plastic such as polymethyl methacrylate or other clear thermoplastic that forms a light guide plate, a thin flexible plastic film such as a sheet of polycarbonate or other thin polymer film, etc.). During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide layer 78 due to the principal of total internal reflection. Light guide layer 78 may include light-scattering features such as pits or bumps or other light-scattering structures. The light-scattering features may be located on an upper surface and/or on an opposing lower surface of light guide layer 78. Light source 72 may be located at the left of light guide layer 78 as shown in FIG. 5 or may be located along the right edge of layer 78 and/or other edges of layer 78.

Light 74 that scatters upwards in direction Z from light guide layer 78 may serve as backlight 44 for display 14. Light 74 that scatters downwards may be reflected back in the upwards direction by reflector 80. Reflector 80 may be formed from a reflective material such as a layer of plastic covered with a dielectric minor thin-film coating. Reflective tape (e.g., white plastic tape or tape formed from other reflective materials) may be incorporated into the backlight reflector for display 14. For example, backlight structures 42 may include a strip of tape that runs along the edge of reflector 80 that is adjacent to light-emitting diodes 72.

Backlight structures 42 may include optical films 70. Optical films 70 may include diffuser layers for helping to homogenize backlight 44 and thereby reduce hotspots, compensation films for enhancing off-axis viewing, and light collimating films such as turning films (prism films, brightness enhancement films, etc.) for collimating backlight 44. Optical films 70 may overlap the other structures in backlight unit 42 such as light guide layer 78 and reflector 80. For example, if light guide layer 78 has a rectangular footprint in the X-Y plane of FIG. 5, optical films 70 and reflector 80 may have a matching rectangular footprint. If desired, films such as compensation films may be incorporated into other layers of display 14 (e.g., polarizer layers).

Figure 6:
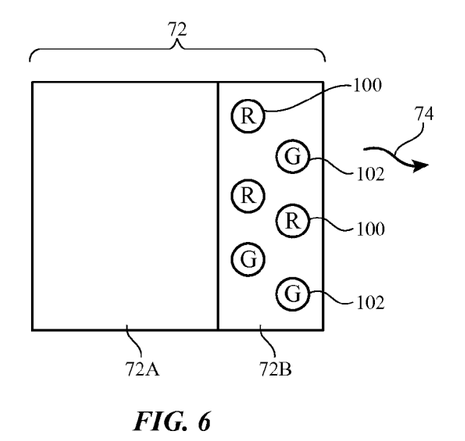
FIG. 6 is a side view of an illustrative light-emitting diode with colored phosphors in accordance with an embodiment.

To enhance the color gamut of display 14, it may be desirable to form light source 72 from light-emitting diode structures characterized by narrow spectral bandwidths. As an example, light source 72 may be based on light-emitting diodes of the type shown in FIG. 6. As shown in FIG. 6, light source (light-emitting diode) 72 may include light-emitting diode die 72A and photoluminescent material 72B. Die 72A may emit pump light. Photoluminescent material 72B may include photoluminescent elements (fluorescent material, phosphorescent material, quantum dots, etc.) that emit light of desired colors in response to illumination (pumping) from the pump light emitted by die 72A.

The pump light from die 72A may be, for example, blue light (i.e., die 72A may be a blue light-emitting diode). Some of the blue pump light may be converted to red and green backlight illumination (or backlight of other colors) by photoluminescent material 72B. Some of the blue pump light from die 72A may remain as unconverted blue light. This unconverted portion of the blue light from die 72A and the red and green emissions from photoluminescent material 72B may form red, green, and blue components of light 74 for use as backlight illumination 44.

If desired, photoluminescent material 72B may be a phosphorescent coating containing phosphors such as red phosphors 100 (e.g., red phosphors such as $K_2SiF_6$) and green phosphors 102 (e.g., β-SiAlON). If desired, the pump light produced by die 72A may have a color other than blue and/or the photoluminescent elements of material 72B may emit light of different colors when pumped (e.g., colors other than red and green). The use of a blue light-emitting diode as pumping diode 72A and red phosphors 100 and green phosphors 102 in photoluminescent coating 72B of FIG. 6 is merely illustrative. Other types of narrowband light source may be used to produce light 74 for use as backlight illumination 44 for display 14 if desired.

Figure 7:
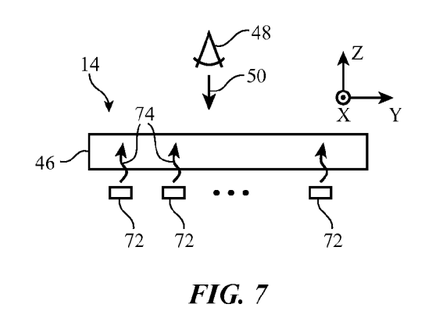
FIG. 7 is a diagram of an illustrative backlight unit that has a two-dimensional array of light-emitting diodes in accordance with an embodiment.

The light 74 that is produced by light source 72 may be emitted into edge 76 of light guide layer 78 as shown in FIG. 5. Alternatively, display 14 may be backlit using a two-dimensional array of light-emitting diodes 72. The two-dimensional array of light-emitting diodes may be placed behind (under) display layers 46, as shown in the illustrative side view of display 14 of FIG. 7. With this type of arrangement, the light output of each of the light-emitting diodes in the two-dimensional array may be individually controlled to implement a local dimming scheme for display 14.

During operation of device 10, it may be desirable to vary the total intensity of backlight 44. For example, it may be desirable to decrease the intensity of backlight 44 when using device 10 in dim lighting conditions to conserve power and it may be desirable to increase the intensity of backlight 44 to help ensure that display 14 is visible when using device 10 in bright lighting conditions. Pulse width modulation and DC current adjustment schemes may be used in controlling the output of backlight structures 42.

Ideally, the color of light 44 would not vary as a function of the output level of backlight structures 42. In practice, color shifts in light 44 may arise when adjusting backlight output levels in backlights formed from light sources such as light source 72 of FIG. 6.

Figure 8:
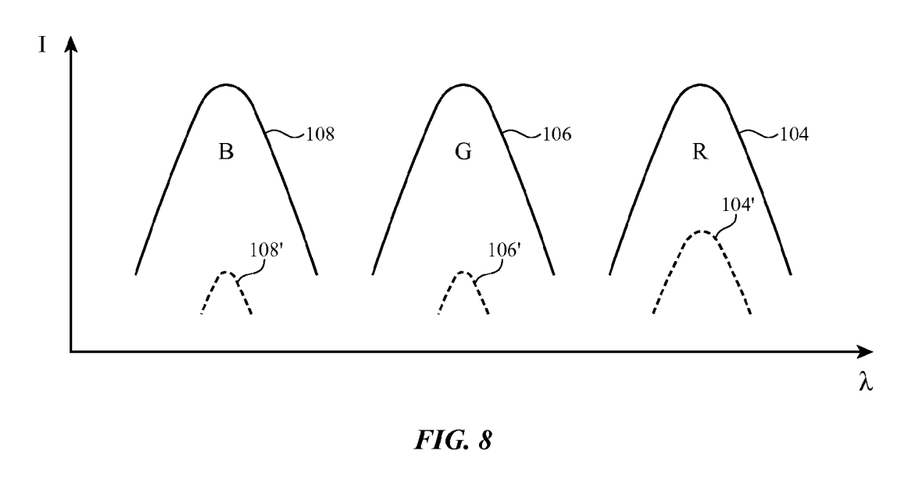
FIG. 8 is a graph showing how backlight of different wavelengths may exhibit spectra with intensities that vary differently as a function of total backlight intensity in accordance with an embodiment.

The risk of color shifts with changes in backlight level is illustrated in the graph of FIG. 8, in which the intensity I of light 74 has been plotted as a function of wavelength λ for illustrative high and low output settings.

When operated in its high setting (e.g., a maximum brightness setting in which the output from light source 72 and therefore backlight structures 42 has been maximized), backlight structures 42 may produce blue light B that is characterized by spectrum 108, green light G that is characterized by spectrum 106, and red light R that is characterized by spectrum 104.

When operated in its low setting, the amount of light produced at each color may be reduced unevenly. As shown in FIG. 8, for example, the amount of blue light B and green light G that is produced may decrease significantly when the total output of backlight structures 42 is reduced, as illustrated by reduced spectrum 108' (for blue light) and reduced spectrum 106' (for green light). Red phosphors 100 may be particularly efficient at low light levels. As a result, backlight structures 42 may produce relatively more red light at low output settings than green and blue light (i.e., spectrum 104' for red light R may be larger in magnitude than blue spectrum 108' and green spectrum 106' when operating at the low output setting). The amount of light produced at green and blue wavelengths may also vary unevenly with respect to each other. These changes in the behavior of backlight structures 42 can lead to undesired variations in the color of backlight illumination 44 as the magnitude of the total output intensity of backlight structures 42 (i.e., the backlight illumination level associated with light 44) is adjusted.

Figure 9:
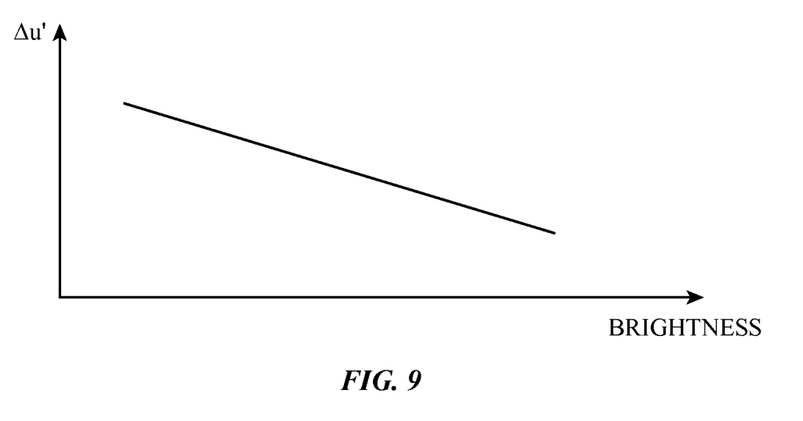
FIGS. 9 and 10 show illustrative variations in the color coordinates of backlight illumination that may be experienced by a backlight due to changes in backlight intensity in accordance with an embodiment.
Figure 10:
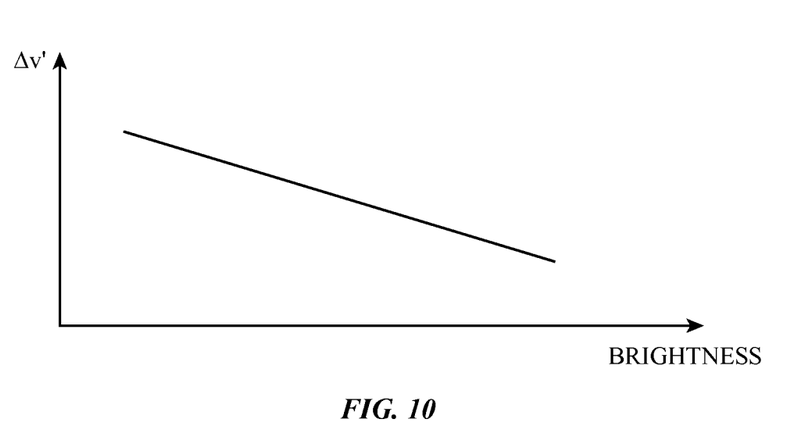

The graphs of FIGS. 9 and 10 illustrate how the color coordinates for light 44 may vary as a function of changes in the backlight illumination level of backlight illumination 44 produced by backlight structures 42. In particular, the graphs of FIGS. 9 and 10 show how respective color coordinates u' and v' in the 1976 CEE Lu'v' color space may increase with decreasing backlight brightness. This variation in the color of backlight illumination 44 represents a potential source of color error when displaying color images on display 14.

During calibration operations, display 14 can be tested using color measurement equipment. The color measurement equipment may gather color measurements in red-green-blue (RGB) format or other suitable color measurement formats. Display 14 may, for example, be directed to display test images of various colors at various different backlight output levels while RGB data is gathered for one or more portions of the display. Operating temperature may influence the color of display 14 (e.g., due to temperature-induced changes in the birefringence of liquid crystal layer 52) so test may be performed at a variety of different operating temperatures.

By measuring deviations in the color of display 14 from a desired nominal white point under different operating conditions, calibration data such as red, green, and blue correction factors (weighting factors) or other suitable calibration data may be obtained. This information may then be stored in look-up table circuitry. During operation, the calibration data from the look-up table circuitry may be applied to the image data being provided to the pixel array of display layers 46, thereby adjusting the color of the image data for display 14 sufficiently to compensate for any deviations in the desired color of backlight illumination 44 at different output levels, deviations in the desired color of images on display 14 due to changes in the operating temperature of display 14, etc.

With one suitable arrangement, the color measurements made during testing may include color measurements at a maximum backlight illumination level and at minimum backlight illumination level and if desired, multiple measurements of this type may be made over a range of temperatures. Interpolation techniques may then be used to produce red, green, and blue correction factors over intermediate values of backlight intensity and, if desired, intermediate temperatures. With another suitable arrangement, color measurements are made over numerous different backlight output levels and temperatures, thereby eliminating or minimizing reliance on interpolation. Each individual display 14 may be calibrated in this way and provided with corresponding individual calibration data or batches of similar displays 14 may be calibrated using shared calibration data (e.g., calibration data gathered by making measurements on a single representative display for a batch of displays or on multiple representative displays for the batch).

Figure 11:
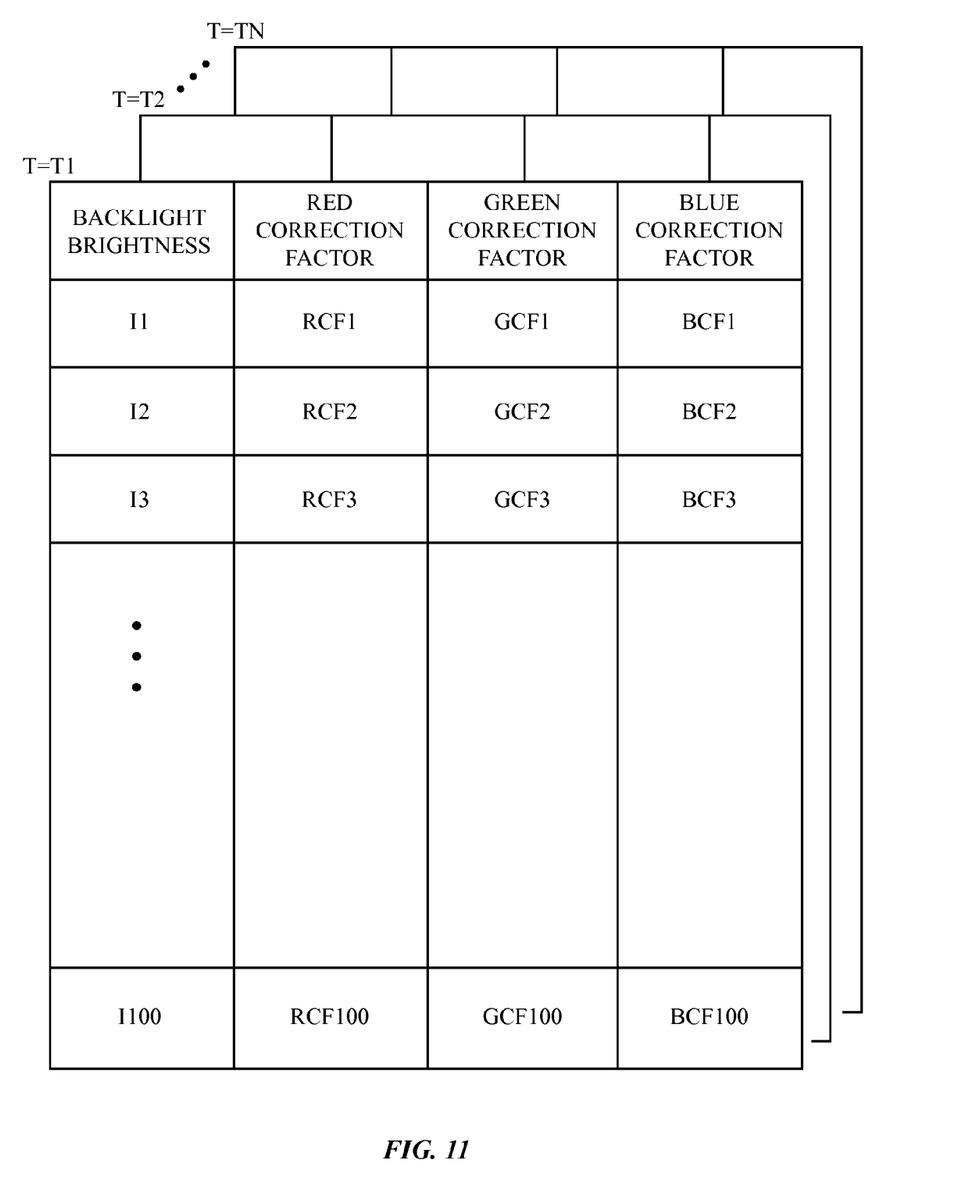
FIG. 11 is a diagram showing look-up table entries of the type that may be used to calibrate a display with color variations of the type shown in FIGS. 8 and 9 and temperature-based color variations in accordance with an embodiment.

FIG. 11 shows how the look-up table data for device 10 may include correction factors to apply to red data (see, e.g., red correction factors RCF1 . . . RCF100), green data (see, e.g., green correction factors GCF1 . . . GCF100), and blue data (see, e.g., blue correction factors BCF1 . . . BCF100). When operating at a backlight intensity of I1, display 14 can be calibrated to compensate for color variations by applying red correction factor RCF1 to the data value of each red pixel in the pixel array of display 14, by applying green correction factor GCF1 to the data value of each green pixel in the pixel array of display 14, and by applying blue correction factor BCF1 to the data value of each blue pixel in the pixel array of display 14. If the output intensity of backlight structures 42 is set to intensity level I3 (as another example), the circuitry of device 10 can correct the image data for display 14 by applying red correction factor RCF3 to the data value of each red pixel, can apply the green correction factor GCF3 to the data value of each green pixel, and can apply the blue correction factor BCF to the data value of each blue pixel. A look-up table of color correction factors may be generated for each of multiple operating temperatures (T1, T2, . . . TN). If desired, real time interpolation techniques may be used to produce correction factors for intermediate temperatures and/or backlight brightness settings. More brightness levels, fewer brightness levels, more operating temperatures, or fewer operating temperatures may be included. The color correction factors of FIG. 11 are merely illustrative.

Figure 12:
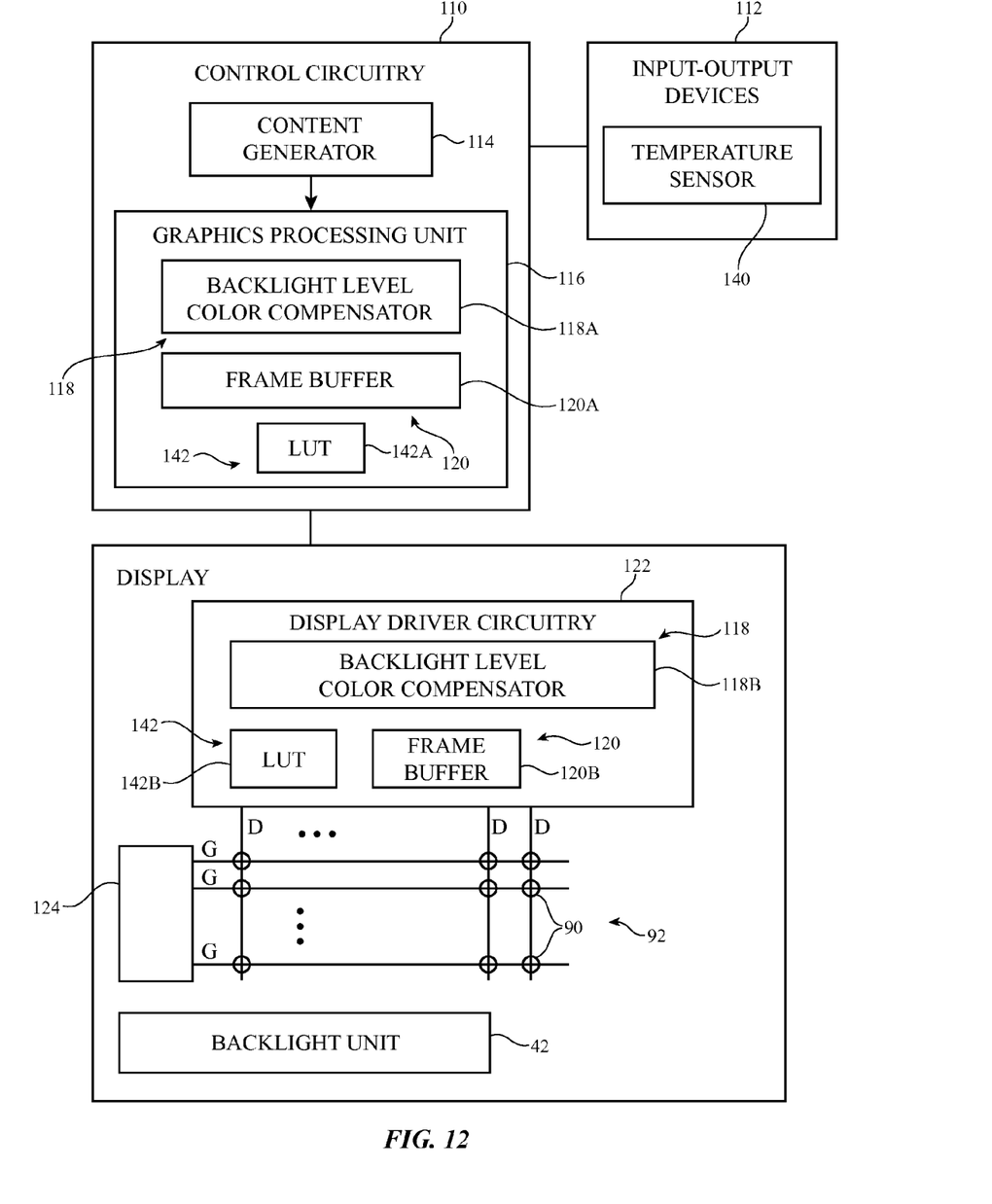
FIG. 12 is a diagram of illustrative circuitry in an electronic device with color compensation capabilities in accordance with an embodiment.

Illustrative circuitry of the type that may be used by device 10 to compensate display 14 for color deviations due to backlight brightness variations and temperature variations is shown in FIG. 12. As shown in FIG. 12, device 10 may have control circuitry 110. Control circuitry 110 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 110 may be used to control the operation of device 10. The processing circuitry may be based on one or more microprocessors, microcontrollers, digital signal processors, baseband processors, power management units, audio chips, application specific integrated circuits, etc.

Control circuitry 110 may include a graphics processing unit such as graphics processing unit 116. Graphics processing unit 116 may receive image frames for frame buffer 120 (e.g., frame buffer 120A) from content generator 114. Content generator 114 may be an application running on control circuitry 110 such as a game, a media playback application, an application that presents text to a user, an operating system function, or other code running on control circuitry 110 that generates image data to be displayed on display 14. While displaying content on display 14, control circuitry 110 may adjust the output level of backlight unit 42, thereby controlling the amount of backlight 44 that passes through display 14 and the associated brightness level of images being displayed on display 14.

Control circuitry 110 may be coupled to input-output circuitry such as input-output devices 112. Input-output devices 112 may be used to allow data to be supplied to device 10 and to allow data to be provided from device 10 to external devices. Input-output devices 112 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 112 and may receive status information and other output from device 10 using the output resources of input-output devices 112. Input-output devices 112 may include a temperature sensor such as temperature sensor 140 to gather information on the current operating temperature of display 14.

Control circuitry 110 may be used to run software on device 10 such as operating system code and applications. During operation of device 10, the software running on control circuitry 110 (e.g., content generator 114) may display images on display 14 using pixels 90 of pixel array 92. Display 14 may include display driver circuitry such as display driver circuitry 122 (see, e.g., circuitry 62A and 62B of FIG. 5) that receives image data from graphics processing unit 116. The display driver circuitry of display 14 may include one or more display driver integrated circuits (e.g., a timing controller integrated circuit or other display driver circuitry such as display driver circuitry 122 of FIG. 9) and gate driver circuitry 124. Gate driver circuitry 124 may be implemented using thin-film transistor circuitry on a display substrate and/or may be implemented using one or more integrated circuits. Array 92 may have display driver circuitry such as circuitry 124 that is located on the left and right edges of array 92, on only the left edge or only the right edge of array 92, or that is located elsewhere in display 14.

Image frames to be displayed on array 92 by the display driver circuitry may be stored in frame buffer 120 (e.g., frame buffer 120B). Look-up table circuitry 142 such as look-up table 142A and/or look-up table 142B may be used to store information for correcting the color of images displayed on display 14 such as the color correction factors of FIG. 11.

Backlight level color compensator 118 may be implemented using resources in graphics processing unit 116 (see, e.g., backlight level color compensator 118A) and/or using resources in display driver circuitry of display 14 (see, e.g., backlight level color compensator 118B). Color compensator 118 may use the temperature-based and backlight-intensity-level-based color correction factors of look-up table circuitry 142 to ensure that color image are accurately displayed on display 14.

Figure 13:
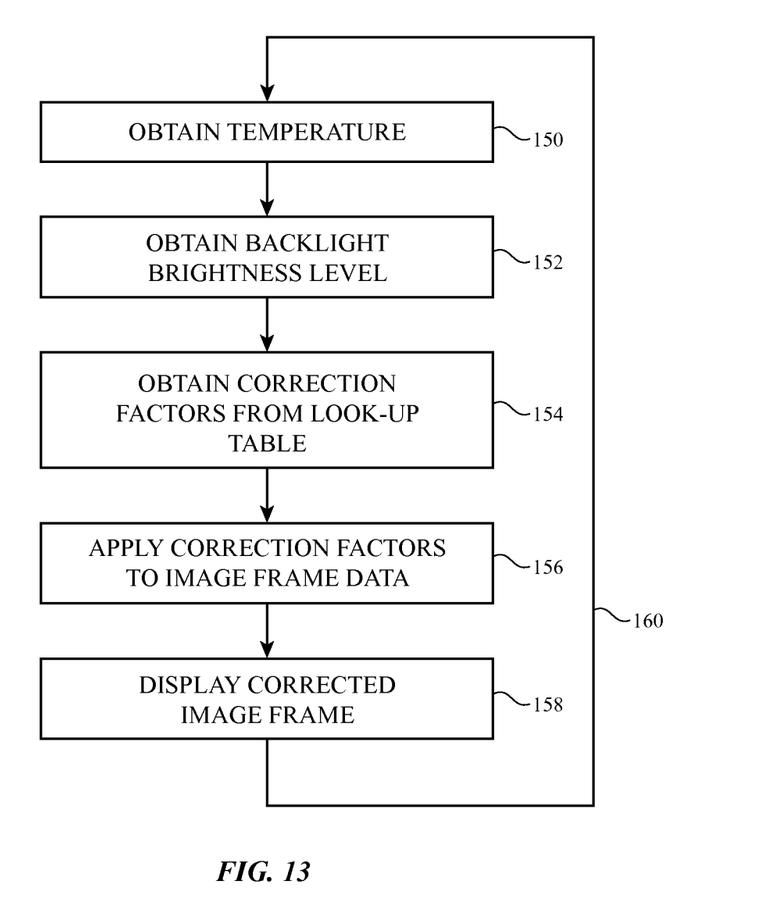
FIG. 13 is a flow chart of illustrative steps involved in operating an electronic device having circuitry for compensating for color variations due to changes in backlight intensity and operating temperature in accordance with an embodiment.

Illustrative steps involved in using color compensator 118 to ensure that display 14 displays color images accurately are shown in FIG. 13.

At step 150, color compensator 118 may obtain information on the current operating temperature of device 10 and display 14 from temperature sensor 140.

At step 152, information on the current backlight illumination level of backlight unit 42 may be obtained by color compensator 118 from control circuitry 110 and/or other circuitry in device 10 (e.g., graphics processing unit 116, display driver circuitry 122, etc.).

At step 154, color compensator 118 may obtain red, green, and blue color correction factors to use for the current operating temperature and backlight brightness setting of display 14 from look-up table circuitry 142.

At step 156, color compensator 118 may apply the red, green, and blue color correction factors to the data for a current frame of image data in frame buffer 120. For example, the red pixel data may be corrected by multiplying the red pixel values by the red correction factor, the green pixel data may be corrected by multiplying the green pixel data by the green correction factor, and the blue pixel data may be corrected by multiplying the blue pixel values by the blue correction factor. If desired, the correction factors may be applied in other ways (e.g., by addition of correction offset values, by applying multiplicative and additive correction factors, etc.). The use of multiplicative color correction factors is merely illustrative.

After updating the data values of the array of pixels in the current image frame to compensate for variations in operating temperature and backlight brightness, the corrected image frame may be displayed on array 92 (step 158). Processing may then loop back to step 150 so that additional frames may be corrected and displayed, as indicated by line 160.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a display having an array of pixels;
   backlight structures that supply backlight illumination for the array of pixels at a backlight illumination level;
   control circuitry that generates image frames that are displayed on the array of pixels of the display; and
   a color compensator that receives the backlight illumination level and operating temperature data for the backlight structures and that compensates the image frames for color deviations in the backlight illumination that depend on the backlight illumination level by applying respective correction factors to a plurality of color data values in the image data that are based on both the received backlight illumination level and the received operating temperature data.

2. The electronic device defined in claim 1 wherein the display operates at an operating temperature, the electronic device further comprising:
   a temperature sensor that measures the operating temperature, wherein the color compensator uses the measured operating temperature from the temperature sensor to compensate the image frames for the color deviations.

3. The electronic device defined in claim 2 wherein the backlight structures include a light source having light-emitting diodes that produce pump light and photoluminescent material that is pumped by the pump light.

4. The electronic device defined in claim 3 wherein the light-emitting diodes produce blue light and wherein the photoluminescent material emits red and green light in response to pumping by the blue light.

5. The electronic device defined in claim 4 wherein the photoluminescent material includes phosphorescent material.

6. The electronic device defined in claim 5 wherein the phosphorescent material includes red phosphors that emit red light when pumped by the blue light and includes green phosphors that emit green light when pumped by the blue light and wherein the backlight illumination includes the red light, the green light, and a portion of the blue light produced by the light-emitting diodes.

7. The electronic device defined in claim 6 wherein the color compensator applies the color correction factors to pixel data values in the images frames.

8. The electronic device defined in claim 7 further comprising:
   look-up table circuitry that stores the color correction factors.

9. The electronic device defined in claim 8 wherein the color correction factors includes red color correction factors for applying to red pixel data values in the pixel data values, green color correction factors for applying to green pixel data values in the pixel data values, and blue color correction factors for applying to blue pixel data values in the pixel data values and wherein the color compensator obtains the red, green, and blue color correction factors from the look-up table circuitry based on the backlight illumination level and the operating temperature.

10. The electronic device defined in claim 9 wherein the array of pixels comprises liquid crystal display pixels.

11. The electronic device defined in claim 10 wherein the backlight structures include a light guide layer and wherein the light source emits the red light, the green light, and the portion of the blue light produced by the light-emitting diodes into an edge of the light guide layer.

12. The electronic device defined in claim 10 wherein the light-emitting diodes are arranged in a two-dimensional array that illuminates the array of pixels.

13. An electronic device that uses image data to display images for a user, comprising:

an array of liquid crystal display pixels into which the image data is loaded to display the images;

a backlight that produces backlight illumination for the array of liquid crystal display pixels at a backlight illumination level, wherein the backlight illumination is characterized by color variations due to changes in the backlight illumination level; and circuitry that receives operating temperature data associated with the electronic device, that receives the backlight illumination level, and that implements a backlight level color compensator that compensates the image data for the color variations by applying respective correction factors to a plurality of color data values in the image data, wherein the correction factors are based on both the operating temperature data associated with the electronic device and the backlight illumination level.

14. The electronic device defined in claim 13 further comprising look-up table circuitry, wherein the backlight level color compensator obtains the color correction factors from the look-up table circuitry.

15. The electronic device defined in claim 14 wherein the backlight level color compensator obtains the color correction factors from the look-up table circuitry based on the backlight illumination level.

16. The electronic device defined in claim 15 further comprising a temperature sensor that measures a current operating temperature for the array of liquid crystal display pixels, wherein the backlight level color compensator obtains the color correction factors from the look-up table circuitry based on the current operating temperature.

17. An electronic device that displays image frames, comprising:

an array of liquid crystal display pixels that displays the image frames;

backlight structures that produce backlight illumination for the array of liquid crystal display pixels at a backlight illumination level, wherein the backlight structures include a light source having an array of blue light-emitting diodes with red and green phosphors; and circuitry that implements a backlight level color compensator that receives operating temperature data for the electronic device and that corrects the image frames for color variations due to changes in the backlight illumination level by adjusting a plurality of color data values in the image frames based on respective predetermined correction factors associated with both the operating temperature and the backlight illumination level.

18. The electronic device defined in claim 17 further comprising a temperature sensor that provides the operating temperature data, wherein the backlight level color compensator corrects the image frames for color variations due to changes in the operating temperature data.

19. The electronic device defined in claim 18 further comprising look-up table circuitry that stores the predetermined color correction factors that the backlight level color compensator applies to the plurality of color data values in the image frames to correct the image frames for the color variations due to the changes in the backlight illumination level and the changes in the operating temperature data.

* * * * *